(12) United States Patent
Klingler et al.

(10) Patent No.: US 11,761,537 B2
(45) Date of Patent: Sep. 19, 2023

(54) GASKET FOR SEALING A DRIVE SHAFT OF A PULP WASHER

(71) Applicant: VALMET AB, Sundsvall (SE)

(72) Inventors: James Michael Klingler, Jaffrey, NH (US); Frank John Merchel, III, Windham, NH (US)

(73) Assignee: VALMET AB, Sundsvall (SE)

( * ) Notice: Subject to any disclaimer, the term of this patent is extended or adjusted under 35 U.S.C. 154(b) by 172 days.

(21) Appl. No.: 17/000,652

(22) Filed: Aug. 24, 2020

(65) Prior Publication Data

US 2022/0056995 A1 Feb. 24, 2022

(51) Int. Cl.
*F16J 15/08* (2006.01)
*F16J 15/54* (2006.01)

(52) U.S. Cl.
CPC .......... *F16J 15/0818* (2013.01); *F16J 15/54* (2013.01)

(58) Field of Classification Search
CPC .............................. F16J 15/54; F16J 15/0818
See application file for complete search history.

(56) References Cited

U.S. PATENT DOCUMENTS

| 2,462,762 | A | * | 2/1949 | Nardin | F16L 23/22 |
| | | | | | 277/609 |
| 3,027,011 | A | | 3/1962 | Flynn | |
| 4,269,417 | A | * | 5/1981 | Dutton | F16J 15/20 |
| | | | | | 408/72 R |
| 4,544,169 | A | * | 10/1985 | Cobb | F16J 15/0881 |
| | | | | | 277/941 |
| 4,688,809 | A | * | 8/1987 | Deppe | F16J 15/0818 |
| | | | | | 277/594 |
| 5,004,250 | A | * | 4/1991 | Udagawa | F16J 15/0818 |
| | | | | | 277/595 |
| 6,260,853 | B1 | | 7/2001 | Carr | |
| 6,948,717 | B1 | | 9/2005 | Carr | |
| 9,188,225 | B2 | * | 11/2015 | White | F16J 15/02 |
| 9,551,422 | B2 | * | 1/2017 | Bond | F16J 15/121 |
| 2003/0080514 | A1 | * | 5/2003 | Barclay | F16J 15/0818 |
| | | | | | 277/598 |
| 2003/0205281 | A1 | | 11/2003 | Anderson et al. | |

(Continued)

FOREIGN PATENT DOCUMENTS

CN 104214230 A 12/2014
CN 105040502 B 4/2017
(Continued)

OTHER PUBLICATIONS

International Search Report and Written Opinion, International Application No. PCT/SE2021/050585, dated Jul. 22, 2021, 13 pages.

*Primary Examiner* — Eugene G Byrd
(74) *Attorney, Agent, or Firm* — Foley & Lardner LLP

(57) ABSTRACT

The present invention relates to a gasket (1, 1', 1") for sealing a drive shaft of a pulp washer, the gasket comprising a gasket body (10) having a central opening delimited by an inner edge (21) and the gasket body (10) also having an outer edge (22), wherein the gasket (10) further comprises a cut-in portion (30) that extends from the outer edge (22) in a radial direction inwards into the gasket body (10).
The invention also relates to a pulp washer comprising at least one such gasket and to a method for mounting such a gasket on a drive shaft of a pulp washer.

19 Claims, 3 Drawing Sheets

(56) References Cited

U.S. PATENT DOCUMENTS

Figure 1:
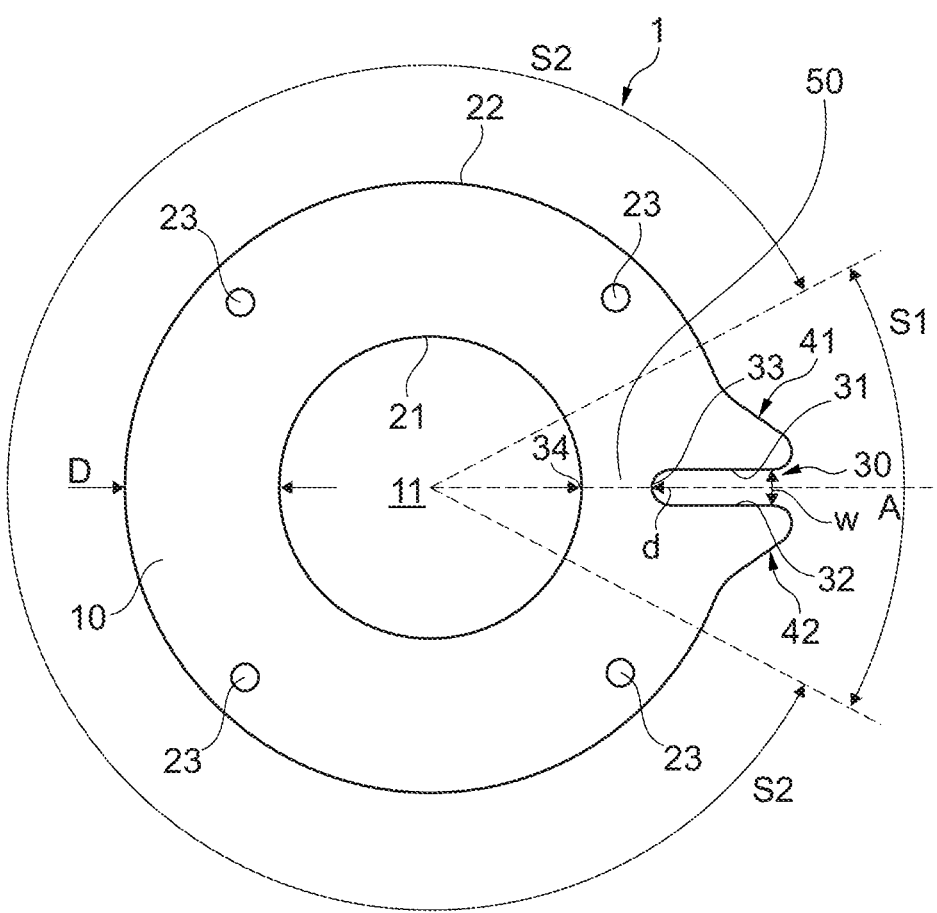

2016/0348635 A1\* 12/2016 Monros ................ F16J 15/0818
2020/0040999 A1\* 2/2020 Saunders ............. F16J 15/0818
2022/0048147 A1\* 2/2022 Bafna .................. F16J 15/0818

FOREIGN PATENT DOCUMENTS

| JP | 2009-133496 A | 6/2009 |
|---|---|---|
| JP | 2020-125817 A | 8/2020 |
| WO | WO-2014/007971 A1 | 1/2014 |

\* cited by examiner

GASKET FOR SEALING A DRIVE SHAFT OF A PULP WASHER

TECHNICAL FIELD

The present invention relates to a gasket for sealing a drive shaft of a pulp washer.

BACKGROUND

Pulp washers are commonly used with the field of producing pulp from a lignocellulosic material. The pulp washer comprises at least one drive shaft that is arranged in connection with a drum that is brought to rotate through a rotation of the drive shaft itself. In order to prevent leakage of vacuum or even of pulp and/or washing liquid from the drum, at least one gasket is commonly placed around the drive shaft to provide a reliable seal.

However, replacing the gasket on the drive shaft in such a way that a reliable seal may be achieved is generally difficult. The gasket is subjected to significant wear and needs replacing at regular intervals, but it is not possible to provide access to an end of the drive shaft such that a circular gasket may be threaded onto the drive shaft and brought to its place in connection with the drum. For this reason a circular gasket is generally cut such that it can be placed around the drive shaft without needing access to the shaft end, but when mounting the gasket and clamping it in place it is often difficult to achieve a correct positioning so that leakage from the drum may be prevented. There is also a risk of injury to the operator mounting the gasket, since the gasket is often held in place manually as a second component is clamped onto the gasket and the operator may suffer damage to their hands if the manual hold is maintained until the second component reaches its place pressed against the gasket. If the hold is abandoned too early, however, the seal provided by the gasket may not be sufficient to prevent leakage since ends of the cut gasket may not be aligned in the desired way. In some applications an adhesive such as red silicone glue is also used in order to fixate the gasket during mounting, but the glue itself may render the gasket slippery and thereby increase difficulty of mounting and tightening bolts that hold the gasket in place. With prior art gaskets, leakage may occur at around 50% of installed gaskets and this causes significant costs due to the increased generation of vacuum needed to counteract the leakage in pulp washers.

Apart from these problems, the time and personnel required for regularly replacing the gaskets is also very costly. Thus, any improvements would result in both a more reliable seal and lower costs for maintenance of the pulp washer.

There is therefore a need for an improved gasket that may solve these problems so that a reliable seal may be achieved without risking injury to the operator and so that leakage is avoided.

SUMMARY

The object of the present invention is to eliminate or at least to minimize the problems discussed above. This is achieved by a gasket, a pulp washer comprising such a gasket and a method for mounting a gasket on a pulp washer according to the appended independent claims.

The gasket according to the present invention comprises a gasket body having a central opening delimited by an inner edge and the gasket body also having an outer edge, wherein the gasket further comprises a cut-in portion that extends from the outer edge in a radial direction inwards into the gasket body. Thereby, a reliable seal may be achieved since the gasket may be held at its outer edge adjacent to the cut-in portion such that sides of the cut-in portion are aligned with each other. This achieves a reliable overlap of the gasket at the inner edge that is opposite to the cut-in portion so that it can be ascertained that leakage is prevented when the gasket is mounted in place around a drive shaft.

Suitably, the gasket body further comprises a first tab extending at least partly in a radial direction outwards and a second tab also extending at least partly in a radial direction outwards, the first tab and the second tab being arranged on either side of the cut-in portion. Thereby, the tabs may be used for holding the gasket during mounting in such a way that injury to the operator performing the mounting is prevented.

Also, the cut-in portion may be delimited in a circumferential direction by a first side and a second side, wherein the first side and the second side are substantially parallel. Thereby, when mounting the gasket the sides of the cut-in portion can be brought together so that it is ascertained that a suitable overlap of the gasket is achieved.

Suitably, the gasket comprises an overlap portion for overlapping in a mounted state, the overlap portion being a part of the gasket body between the cut-in portion and the inner edge, and the gasket preferably also comprising a cutting line for indicating a suitable line for cutting the gasket, the cutting line extending through the overlap portion from the inner edge to the cut-in portion. The overlap portion has the advantage of forming an overlap as the gasket is mounted on a drive shaft. Also, the cutting line being provided on the gasket body has the advantage that the gasket is prepared to be cut so that the benefits of providing the cut-in portion in allowing for the overlap during mounting may be achieved. In some embodiments, the gasket may be provided with a cut already performed along the cutting line, whereas in other embodiments the cutting line may be indicated on the gasket body and the cut itself may be performed in connection with mounting the gasket around the drive shaft. It is advantageous to provide the cutting line so that the cut being performed can be placed along a center of the overlap portion to the bottom of the cut-in portion, since this aids in distributing stress in a symmetrical way in the gasket body as the gasket is held in place during mounting.

The first tab and the second tab may also each be arranged adjacent to the cut-in portion on the gasket body. Thereby, the tabs may provide holds that are used for guiding the gasket in an efficient and reliable way during mounting.

Also, the gasket body may suitably be substantially circular and comprise a first circular sector in which the first tab, the second tab and the cut-in portion are arranged. The gasket body may also comprise a second circular sector that comprises a remainder of the gasket body such that the second circular sector borders on the first circular sector at both sides. Thereby, the cut-in portion and the tabs are provided together in the first circular section and the rest of the gasket body has a conventional circular shape. This allows for holding the tabs during mounting and stretching the gasket body in a symmetrical way so that it is arranged as desired around the drive shaft.

Suitably, the gasket body has an average second distance in a radial direction from the inner edge to the outer edge, and said average second distance is an average distance from the inner edge to the outer edge of the gasket body in the second circular sector.

In relation to this average second distance, a distance from the inner edge to the outer edge of each of the first tab and the second tab is at least 1.1 times the average second distance, preferably at least 1.2 times. Thereby, the tabs extend far enough compared with the rest of the gasket body that they can be held securely during mounting without risking the part that is provided for fixing the gasket in place also clamping the hands of the operator so that injury may be caused.

Also in relation to the average second distance, a distance from the inner edge to the cut-in portion may be less than 0.5 times the average second distance, preferably less than 0.3 times the average second distance. This provides a sufficient distance of the gasket between the inner edge and the cut-in portion to ensure that an overlap of the gasket in this area provides a secure seal when mounted around the drive shaft.

Suitably, the gasket may further comprise a first inner tab extending inwards into the central opening and a second inner tab also extending inwards into the central opening, wherein said first inner tab and second inner tab are arranged adjacent to each other and opposite from the cut-in portion. Thereby, the inner tabs may serve to extend the circumference of the central opening when the gasket is stretched around the drive shaft and held in place during mounting. The inner tabs are then angled so that they provide an extension of the inner circumference of the gasket and allow for a more secure and reliable seal when mounted.

Alternatively, the inner edge of the gasket may be substantially circular. This still allows for the benefits of mounting the gasket with an overlap due to the cut-in portion being provided in the gasket body, while at the same time allowing for easier manufacturing of the gasket since a circular form of the gasket may be used with the cut-in portion and optionally also tabs added to the circular shape.

Suitably, the gasket may be symmetrical about a symmetry axis, said symmetry axis extending in the radial direction along a center of the cut-in portion. Thereby, a stretching of the gasket during mounting will also be symmetrical so that an even distribution of the gasket around the drive shaft is achieved.

According to the present invention, a pulp washer for washing a lignocellulosic material during production of pulp is also provided. The pulp washer comprises at least one drive shaft and also at least one gasket according to the present invention, said gasket being arranged to seal the drive shaft. Thereby, a reliable seal is provided for the drive shaft so that leakage from the pulp washer is prevented.

The present invention also encompasses a method for mounting a gasket on a drive shaft of a pulp washer, the method comprising the steps of
 providing a gasket according to the present invention
 applying the gasket around a drive shaft of a pulp washer and mounting a second component on the gasket in order to fixate the gasket in place on the drive shaft.

Thereby, the gasket is able to provide a reliable seal around the drive shaft so that leakage from the pulp washer is prevented.

Suitably, the method further comprises the step of
 cutting the gasket from the inner edge to the cut-in portion before applying the gasket around the drive shaft.

Thereby, the gasket is cut in such a place in the gasket body that an overlap can be achieved in order to reliably seal the drive shaft.

Also, the gasket may comprise a first tab extending at least partly in a radial direction outwards and a second tab also extending at least partly in a radial direction outwards, with the first tab and the second tab being arranged on either side of the cut-in portion. The method then further comprises
 holding the first tab and the second tab during mounting of the second component for guiding the gasket to provide a seal around a circumference of the drive shaft during mounting of the second component.

Thereby, the risk of injury for the operator mounting the gasket may be eliminated while at the same time providing a reliable seal around the drive shaft.

Many additional benefits and advantages of the present invention will be readily understood by the skilled person in view of the detailed description below.

DRAWINGS

Figure 2:
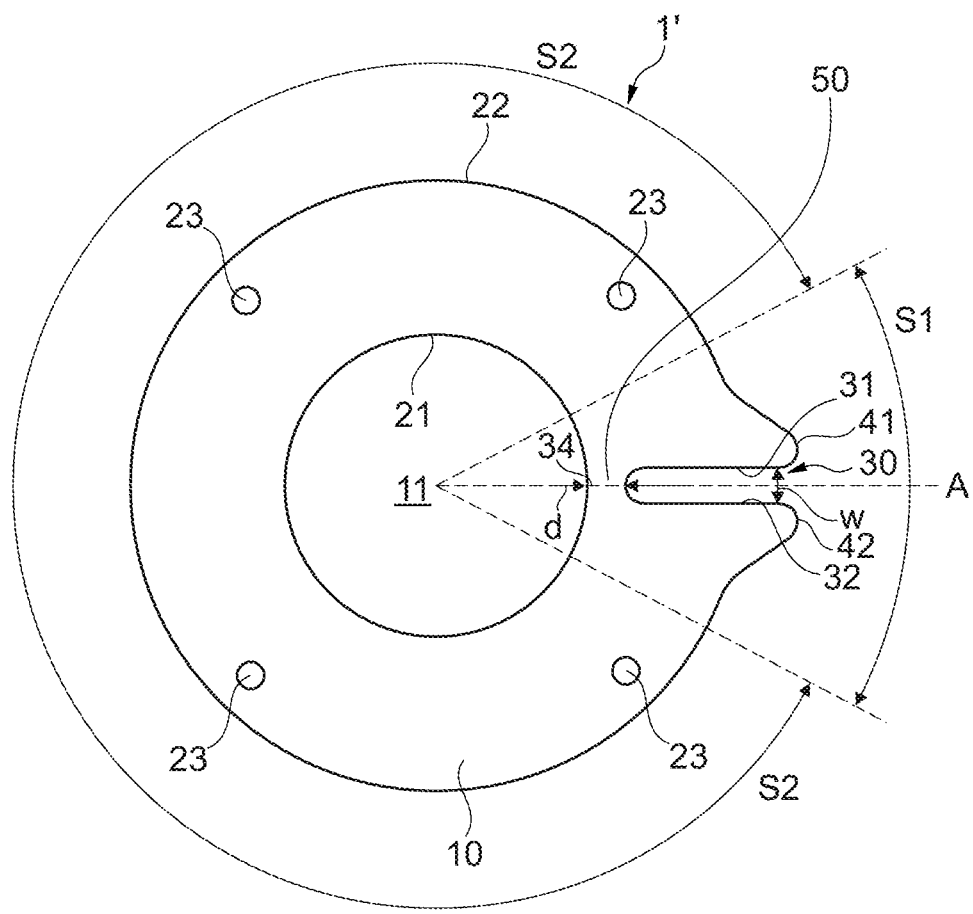

The invention will now be described in more detail with reference to the appended drawings, wherein FIG. 1 discloses a first embodiment of a gasket according to the present invention;

FIG. 2 discloses a second embodiment of the gasket of the invention; and

Figure 3:
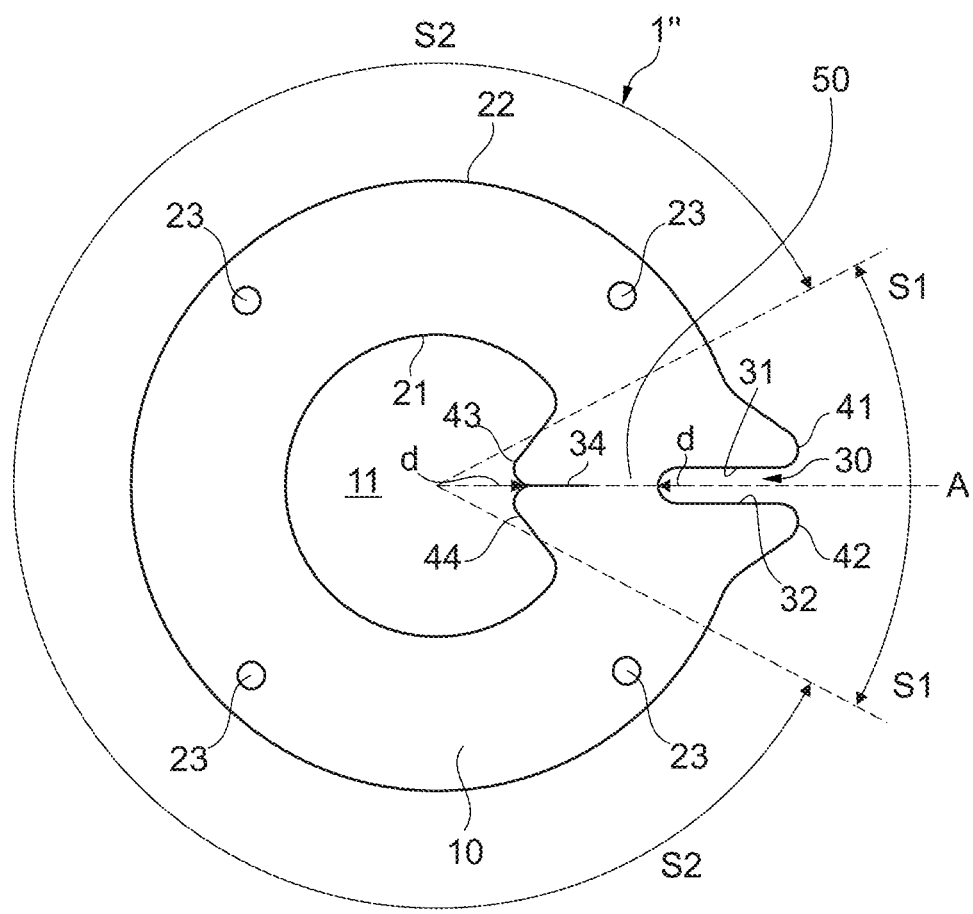

FIG. 3 discloses a third embodiment of the gasket of the invention.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

The gasket of the present invention is for use with a pulp washer used in producing pulp from a lignocellulosic material. Details and operation of pulp production and of pulp washers are not provided herein but are already known in the art. Suffice it to say that pulp washers generally comprise at least one rotating drum in which pulp is held during washing with a washing liquid, and that the drum is arranged to rotate around a drive shaft that extends through at least one wall of the drum so that there is a risk that vacuum is not maintained inside the washer or even that pulp and liquid held inside the drum could leak out at the drive shaft unless a seal such as a gasket is provided to prevent this. The seal or gasket is held in place between a first surface of the pulp washer and a second surface, generally provided by mounting a second component around the drive shaft and fastening the second component to the pulp washer by tightening fastening devices such as bolts or screws to clamp the gasket between the first surface and the second surface.

The drive shaft of the pulp washer generally has a diameter of 27.3 cm (10¾") but the gasket according to the present invention could be used with any shaft by adapting dimensions of the gasket to be able to provide a seal around the shaft. In pulp washers, installation of the drive shaft generally involves five gaskets but this may in some pulp washers be varied so that fewer or more gaskets are required.

In the following, the term "substantially" (e.g. "substantially circular", "substantially constant") will be used to signify that an object fulfills a criterion as far as possible within manufacturing tolerances. This means that a substantially circular object is circular or varies only slightly from being circular, and that a substantially constant value is constant within manufacturing tolerances.

In the following, the word "constant" will also be used to signify that a value or distance is constant within 10% of its total value or length.

In the following, the gasket according to the present invention will be described with reference to three embodiments shown in the Figures. The pulp washer according to the present invention is suitable for use with a gasket according to any of the embodiments shown herein.

The gasket according to the present invention may be made from any material that is suitable for use in sealings or gaskets. Examples of such materials are natural rubber and neoprene.

Thus, FIG. 1 discloses a first embodiment of a gasket 1 according to the invention, the gasket 1 having a gasket body 10 with a central opening 11 that is delimited by an inner edge 21. From the inner edge 21, the gasket body 10 extends to an outer edge 22. Also provided is a cut-in portion 30 that extends into the gasket body 10 in a radial direction inwards from the outer edge 22. The cut-in portion 30 has a bottom 33, a first side 31 and a second side 32 in the gasket body 10, and the first side 31 and second side 32 are preferably parallel to each other and more preferably also parallel to a radial axis A that extends radially outwards from the central opening 11 and through a middle of the cut-in portion 30. The gasket body 10 extends a first distance d from the inner edge 21 to the bottom 33 of the cut-in portion 30 along the radial axis A. A cutting line 34 extends from the inner edge 21 to the cut-in portion 30 and may suitably extend in a straight line along the radial axis A to the bottom 33. However, the cutting line 34 could alternatively be placed in any way as long as it is able to connect the inner edge 21 to the cut-in portion 30. Suitably, the cut-in portion 30 is created in the shape of a rectangle extending radially inwards into the gasket body 10. Advantageously, inner corners of the rectangle at the bottom 33 of the cut-in portion are cut with a curve so that a rounded bottom 33 is achieved. This has the benefit of yielding a higher material strength of the gasket body 10 so that the risk of deformation or ripping of the gasket body 10 at the bottom 33 of the cut-in portion 30 during mounting is significantly decreased.

In the gasket body 10, an overlap portion 50 is further provided between the cut-in portion 30 and the inner edge 21. This is a part of the gasket body 10 that overlaps at least partially when the gasket 1 is mounted around a drive shaft and that serves to provide a secure seal so that leakage is prevented or at least decreased.

Also provided in the gasket body may be a plurality of through holes 23 through which fastening devices such as screws may protrude when the gasket 1 is mounted on a pulp washer.

The gasket body 10 extends a second distance D in a radial direction from the inner edge 21 to the outer edge 22. In this first embodiment, the second distance D is substantially constant or close to constant in a circumferential direction around the gasket 1 apart from a first circular sector S1 that encompasses the cut-in portion 30 and that may suitably also include at least outer tabs 41, 42 but possibly also inner tabs (see FIG. 3). The gasket body 10 apart from the first circular section S1 forms a second circular sector S2 that borders on the first circular sector S1 so that the first and second circular sectors S1, S2 together forms a full revolution and enclose the entire gasket body 10. Thus, in this first embodiment the gasket body 10 is circular in the second circular sector S2 but may in the first circular sector S1 instead be formed such that the inner edge 21 is extended or elongated as compared with a circle having a diameter of the central opening 11 in the second circular sector S2. Suitable extensions of the inner edge 21 are also discussed further below.

In this first embodiment the gasket body 10 is circular or substantially circular such that the central opening 11 has a substantially constant diameter in order to fit around the drive shaft that generally has a circular cross-section. Similarly, the outer edge 22 is also substantially circular such that a distance from the center of the central opening 11 to the outer edge 22 is constant or varies very little in the second circular sector S2. This is advantageous since it minimizes material consumption when manufacturing the gasket and since a second component that is mounted on the pulp washer in order to fix the gasket 1 in place is generally also circular. Thereby, the gasket 1 will generally be shaped to fit around the drive shaft but not extend significantly beyond the second component. However, in other embodiments the gasket 1 could instead have another shape as long as it is able to provide a seal around the drive shaft and to be held in place by the second component. In some embodiments it is also advantageous that the inner edge 21 is not circular but instead elongated to form an oval or similar shape in order to fit around the drive shaft with an overlap and thereby seal against the drive shaft that has a circular cross-section.

In the second circular sector, the second distance D suitably varies very little so that the second distance D is substantially constant. Throughout the second circular sector S2, an average second distance D is defined as an average distance from the inner edge 21 to the outer edge 22 in the second circular sector S2.

In the first circular section S1, the cut-in portion 30 has a width w and preferably outer tabs 41, 42 are also provided on either side of the cut-in portion 30 so that a first tab 41 borders the cut-in portion 30 on one side and a second tab 42 borders the cut-in portion 30 on the other side. The outer tabs 41, 42 serve to provide holds for handling the gasket 1 during mounting, and for this purpose it is advantageous that the outer tabs 41, 42 extend farther from the center of the central opening 11 than the outer edge 22 does in the second circular sector S2 so that the outer tabs 41, 42 protrude beyond the second component during mounting of the gasket 1. This significantly facilitates mounting the gasket 1.

In some embodiments, the outer tabs 41, 42 could be provided at a distance from the cut-in portion 30 in a circumferential direction, but in order to function as holds during mounting they should be placed one on either side of the cut-in portion 30 even if they are at a distance in the circumferential direction.

The first tab 41 and the second tab 42 are suitably similar in length from the inner edge 21 and may also have a similar shape or be mirror images of each other. This is beneficial in facilitating gripping and handling the outer tabs 41, 42 and also in ensuring that stretching or extending the gasket 1 is evenly distributed along the gasket body 10 in the first circular sector S1 during mounting in order to ensure that a seal is created as desired.

In the first embodiment, the gasket 1 is symmetrical about a symmetry axis that extends radially through the first circular sector S1. Suitably, the symmetry axis is identical with the radial axis A.

When installing the gasket 1, overlap portion 50 between the bottom 33 of the cut-in portion 30 and the inner diameter 21 provides an overlap so that a reliable seal is achieved. Compared with prior art gaskets, the gasket 1 according to the invention has a circumference of the inner edge 21 that is longer than a circumference of the drive shaft on which the gasket 1 is to be mounted such that an overlap can be provided in the mounted state. This overlap is ensured by the holes 23 that are provided for fastening devices of the pulp washer being moved in a circumferential direction as compared with prior art gaskets such that an increase of the inner circumference is achieved in the first circular sector S1. The inner edge 21 should suitably have a length that is 4-12% longer than a circumference of the drive shaft, more suitably 5-10% longer and even more preferably 7-8% longer.

For the first embodiment, suitable dimensions for being able to fit the gasket 1 on a 27.3 cm (10¾") drive shaft are an inner diameter of the central opening 11 of 22.2 cm (8¾") and an outer diameter of the gasket body 10 of 43.2 cm (17"). This results in an average second distance D of 21 cm in the second circular sector S2. The cut-in portion 30 is suitably made in the form of a rectangle having a length of 7.0 cm (2¾") and a width w of 3.8 cm (1½") to the bottom 33 but with a rounded bottom 33 as described above. This leaves a first distanced of 3.5 cm (1⅜") from the bottom 33 radially inwards to the inner edge 21. The outer tabs 41, 42 extend 3.5 cm (1¾") and have a width of 7.6 cm (3").

In the first embodiments, the holes 23 may have a diameter of 1.9 cm (¾") and a distance from the center of the central opening 11 to a center of each of the holes 23 may be 37.5 cm (14¾"). The holes 23 are suitably distributed around the gasket body 10 at 0°, 85°, 173° and 258°.

For the first embodiment, the gasket body 10 at the outer tabs 41, 42 suitably extend at least 1.1 times the average second distance from the inner edge 21 to a tip of the tab, more preferably at least 1.15 times. For this embodiment with an average second distance D of 21 cm this means that each of the outer tabs 41, 42 extend at least 23 cm in the radial direction from the inner edge 21 to the tip of the tab, more preferably at least 24 cm.

Also, the first distance d from the bottom 33 of the cut-in portion 30 to the inner diameter 21 is suitably less than 0.4 times the average diameter, preferably less than 0.2 times the average diameter. For the first embodiment shown in FIG. 1 with the dimensions given above, this would mean that the first distance d is suitably less than 8.4 cm and preferably less than 4.2 cm.

FIG. 2 discloses a second embodiment of the gasket according to the present invention. The gasket 1' differs from the gasket 1 of the first embodiment mainly in the first distance d from the bottom 33 of the cut-in portion 30 to the inner edge 21 being smaller. This is achieved through an increase in the diameter of the central opening 11 such that the gasket 1' can be fitted around a drive shaft with a larger diameter. However, even with a shorter first distance d the gasket 1' of the second embodiment is still able to achieve a reliable seal by the gasket body overlapping during mounting in the area of the overlap portion 50.

In other respects, the gasket 1' according to the second embodiment is similar or identical to the gasket 1 of the first embodiment with like reference numerals denoting parts that are identical and/or have the same function between the embodiments.

Suitable dimensions for the second embodiment 1' are with outer tabs extending 3.8 cm (1½) further in the radial direction than the outer circumference 22 in the second circular sector S2. The inner diameter of the central opening 11 is 24.8 cm (9¾) and the outer diameter is 43.2 cm (17") resulting in an average second distance D of 18.4 cm. The cut-in portion has a length into the gasket body 10 of 7.0 cm (2¾) to the bottom 33 and a width w of 3.8 cm (1½). The first distance d is in this embodiment 2.2 cm (⅞"). The dimensions and placement of the holes 23 is identical to the first embodiment.

FIG. 3 discloses a third embodiment of a gasket 1" according to the invention. The gasket 1" of FIG. 3 differs from the first embodiment and the second embodiment mainly through the addition of inner tabs 43, 44 that are provided in the gasket body 10 in the first circular sector S1 and that extend radially inwards into the central opening 11. The inner tabs 43, 44 are provided as a first inner tab 43 and a second inner tab 44 that are provided on either side of the radial axis A. Suitably, the cutting line 34 is provided between the inner tabs 43, 44 such that the gasket 1" is cut along the symmetry line of the radial axis A.

The inner tabs 43, 44 provide a significant lengthening of the inner edge 21 such that the gasket 1" can be placed around the drive shaft and provide an improved overlap since the gasket body 10 has additional material at the inner tabs 43, 44 such that a larger overlap portion 50 is achieved. Due to the presence of the inner tabs 43, 44, the gasket 1" thus forms a more efficient overlap starting at the inner tabs 43, 44 and is able to form the desired seal in an even more efficient way.

The inner tabs 43, 44 are suitably provided in the overlap portion 50 opposite from the cut-in portion 30 such that they are able to provide the overlap when mounted.

Suitable dimensions for the gasket 1" of the third embodiment are those dimensions given above with reference to the first embodiment, except that the inner tabs 43, 44 extend a length of 3.81 cm (1½") into the central opening 11 and have a width of 6.35 cm (2½").

Apart from the inner tabs 43, 44, the third embodiment of the gasket 1" is identical to the gasket 1 of the first embodiment and the gasket 1' of the second embodiment, with like reference numerals denoting parts that are identical and/or have the same function between the embodiments.

The mounting of the gasket 1, 1', 1" according to the present invention will now be described in more detail.

The gasket 1, 1', 1" may be provided as described above but may alternatively also be provided with a cut along the cutting line 34 such that the gasket 1, 1', 1" is already open before mounting.

Thus, in order to mount the gasket 1, 1', 1" in a pulp washer, a pre-cut gasket 1, 1', 1" is provided or alternatively the gasket 1, 1', 1" is cut through the overlap portion 50 from the inner edge 21 to the bottom 33 of the cut-in portion 30. Suitably, the cut extends along the cutting line 34 but optionally the cut instead extends along any line between the inner edge 21 and the bottom 33 of the cut-in portion 30.

Then, the gasket 1, 1', 1" is placed around a drive shaft of a pulp washer such that the inner edge 21 is in contact with the drive shaft around its circumference. The gasket 1, 1', 1" is held on a first surface of the pulp washer in this position and the first surface preferably has fastening devices such as screws that extend from the first surface and with which the holes 23 of the gasket 1, 1', 1" are aligned. The outer tabs 41, 42 are gripped and held so that the gasket 1, 1', 1" remains in place as desired. Alternatively, if no tabs 41, 42 are provided on the gasket 1, 1', 1" an outer part of the gasket body 10 adjacent to the cut-in portion 30 may instead be held. The gasket 1, 1', 1" is held so that an overlap is provided in the overlap portion 50 of the gasket body 10 between the bottom 33 of the cut-in portion 30 and the inner edge 21. The gasket 1, 1', 1" can be held by hand or alternatively with tools such as pliers.

Next, a second component having a second surface is placed on the gasket 1, 1', 1" such that the gasket 1, 1', 1" is held between the first surface of the pulp washer and the second surface of the second component. The second component is mounted e.g. by tightening bolts onto the fastening devices so that the second component is pressed against the first component.

It is to be noted that the dimensions given above for the embodiments of the present invention serve only as an example of suitable dimensions in order to achieve the benefits of the invention. It is especially to be noted that the dimensions may be varied as desired.

It is to be noted that features from the various embodiments described herein may freely be combined, unless it is explicitly stated that such a combination would be unsuitable.

The invention claimed is:

1. A gasket for sealing a drive shaft of a pulp washer, the gasket comprising:
   a gasket body having an outer edge, and an inner edge that delimits a central opening, the gasket body having a center point, a first portion and a second portion, the first portion having a first radius from the center point, the second portion having a second radius from the center point, the second radius being greater than the first radius, the second portion further comprising:
      a first tab extending outwards at least partly in a radial direction, and
      a second tab also extending outwards at least partly in a radial direction; and
   exactly one elongated cut-in portion that extends inwards into the gasket body from the outer edge toward the inner edge in a radial direction, wherein a length of the cut-in portion in the radial direction is greater than a width of the cut-in portion in a direction perpendicular to the radial direction, the cut-in portion comprising:
      a first side,
      a second side parallel to the first side, and
      a third side contiguous with the first side and the second side, the third side having a third radius from the center point, the third radius being less than the first radius;
   wherein the first tab and the second tab are arranged on either side of the cut-in portion.

2. The gasket of claim 1, wherein the gasket comprises:
   an overlap portion for overlapping in a mounted state, the overlap portion being a part of the gasket body between the cut-in portion and the inner edge, and
   a cutting line for indicating a suitable line for cutting the gasket, the cutting line extending through the overlap portion from the inner edge to the cut-in portion.

3. The gasket of claim 1, wherein the first tab and the second tab are each arranged adjacent to the cut-in portion on the gasket body.

4. The gasket of claim 1, wherein the gasket body is substantially circular and comprises a first circular sector in which the first tab, the second tab and the cut-in portion are arranged, and a second circular sector that comprises a remainder of the gasket body such that the second circular sector borders on the first circular sector at both sides.

5. The gasket of claim 4, wherein the gasket body has an average second distance in a radial direction from the inner edge to the outer edge, the average second distance being an average distance from the inner edge to the outer edge of the gasket body in the second circular sector.

6. The gasket of claim 5, wherein a distance from the inner edge to the outer edge of each of the first tab and the second tab is at least 1.1 times the average second distance.

7. The gasket of claim 5, wherein a distance from the inner edge to the cut-in portion is less than 0.5 times the average second distance.

8. The gasket of claim 1, wherein the gasket further comprises a first inner tab extending inwards into the central opening and a second inner tab also extending inwards into the central opening, the first inner tab and the second inner tab being arranged adjacent to each other and opposite from the cut-in portion.

9. The gasket of claim 1, wherein the inner edge is substantially circular.

10. The gasket of claim 1, wherein the gasket is symmetrical about a symmetry axis, the symmetry axis extending in the radial direction along a center of the cut-in portion.

11. A pulp washer for washing a lignocellulosic material during production of pulp, the pulp washer comprising a drive shaft and the gasket of claim 1 that is arranged to seal the drive shaft.

12. A method for mounting a gasket on a drive shaft of a pulp washer, the method comprising:
   providing the gasket of claim 1,
   cutting the gasket body from the cut-in portion to the inner edge,
   applying the gasket around a drive shaft of a pulp washer after cutting the cut-in portion, and
   mounting a second component on the gasket in order to fixate the gasket in place on the drive shaft.

13. The method of claim 12, wherein:
   the method further comprises holding the first tab and the second tab during mounting of the second component for guiding the gasket to provide a seal around a circumference of the drive shaft during mounting of the second component.

14. The gasket of claim 1, wherein the cut-in portion is delimited in a circumferential direction by a first side and a second side, wherein the first side and the second side are substantially parallel.

15. The gasket of claim 1, wherein the first tab and the second tab are each arranged adjacent to the cut-in portion on the gasket body.

16. The gasket of claim 5, wherein a distance from the inner edge to the cut-in portion is less than 0.3 times the average second distance.

17. The method of claim 12, wherein:
   the method further comprises holding the first tab and the second tab during mounting of the second component for guiding the gasket to provide a seal around a circumference of the drive shaft during mounting of the second component.

18. The gasket of claim 1, further comprising a plurality of through holes at locations between the inner edge and the outer edge configured to receive fasteners.

19. A gasket for sealing a drive shaft of a pulp washer, the gasket comprising:
   a gasket body having an outer edge, and an inner edge that delimits a central opening, the gasket body having a center point, a first portion and a second portion, the first portion having a first radius from the center point, the second portion having a second radius from the center point, the second radius being greater than the first radius, the second portion further comprising:
      a first tab extending outwards at least partly in a radial direction, and
      a second tab also extending outwards at least partly in a radial direction;
   exactly one elongated cut-in portion that extends inwards into the gasket body from the outer edge toward the inner edge in a radial direction, wherein a length of the cut-in portion in the radial direction is greater than a width of the cut-in portion in a direction perpendicular to the radial direction, the cut-in portion comprising:
      a first side,
      a second side parallel to the first side, and a third side contiguous with the first side and the second side, the third side having a third radius from the center point, the third radius being less than the first radius; and a cut extending from the cut-in portion to the inner edge;

wherein the first tab and the second tab are arranged on either side of the cut-in portion.

\* \* \* \* \*